United States Patent
Elias et al.

(10) Patent No.: US 9,070,161 B2
(45) Date of Patent: Jun. 30, 2015

(54) METHOD OF CONDUCTING AUCTIONS AND AUDIENCE GUIDED EVENTS UTILIZING CLOSED NETWORK SATELLITE BROADCASTS TO MULTIPLE LOCATION DIGITAL THEATER ENVIRONMENTS WITH INTEGRATED REAL TIME AUDIENCE INTERACTION

(76) Inventors: Philip L. Elias, Pittsburgh, PA (US); Jeff Esswein, Pittsburgh, PA (US)

( * ) Notice: Subject to any disclaimer, the term of this patent is extended or adjusted under 35 U.S.C. 154(b) by 0 days.

(21) Appl. No.: 13/586,762

(22) Filed: Aug. 15, 2012

(65) Prior Publication Data

US 2013/0212607 A1 Aug. 15, 2013

Related U.S. Application Data

(60) Provisional application No. 61/523,615, filed on Aug. 15, 2011.

(51) Int. Cl.
*H04N 7/20* (2006.01)
*G06Q 30/08* (2012.01)
*H04N 21/414* (2011.01)
*H04N 21/475* (2011.01)

(52) U.S. Cl.
CPC .......... *G06Q 30/08* (2013.01); *H04N 21/41415* (2013.01); *H04N 21/4756* (2013.01)

(58) Field of Classification Search
CPC ... G06Q 30/08; G06Q 30/0283; G06Q 10/02; G06Q 30/0275; G06Q 30/06; H04N 21/25435; H04N 7/17336; H04N 21/2393; H04N 21/41407; H04N 21/41415; H04L 12/2856; H04L 12/2876

USPC ............................................... 705/37; 725/13
See application file for complete search history.

(56) References Cited

U.S. PATENT DOCUMENTS

| 3,943,641 | A | | 3/1976 | Dworetzky |
|---|---|---|---|---|
| 4,789,928 | A | | 12/1988 | Fujisaki |
| 4,974,252 | A | * | 11/1990 | Osborne ..................... 379/92.01 |
| 5,223,923 | A | | 6/1993 | Morales-Garza |
| 5,226,177 | A | | 7/1993 | Nickerson |
| 5,257,099 | A | | 10/1993 | Morales-Garza |
| 5,453,015 | A | | 9/1995 | Vogel |
| RE35,449 | E | | 2/1997 | Derks |
| 5,774,873 | A | | 6/1998 | Berent et al. |

(Continued)

*Primary Examiner* — Mark D Featherstone
*Assistant Examiner* — Jen-Shi Huang
(74) *Attorney, Agent, or Firm* — Blynn L. Shideler; Krisanne Shideler; BLK Law Group

(57) ABSTRACT

A method of conducting a real time auction comprises the steps of: Broadcasting from a production studio at least high definition images of material of each lot being auctioned to at least a plurality of digital theater environments via satellite; Providing multiple auction bidders at each digital theater environment; Providing each auction bidder with individually assigned audience response system input devices; and Receiving bid information at the production studio from selected auction bidders for each lot being auctioned over a bid receiving network via the individual audience response system input devices. A method of conducting an audience guided event includes satellite broadcasting in high definition to multiple digital theater environments where event participants have individually assigned audience response system input devices in which individual participant information is associated with each assigned individually assigned audience response system input device including at least bibliographic participant information.

20 Claims, 3 Drawing Sheets

(56) References Cited

U.S. PATENT DOCUMENTS

| | | |
|---|---|---|
| 5,794,219 A | 8/1998 | Brown |
| 5,812,642 A | 9/1998 | Leroy |
| 5,818,914 A | 10/1998 | Fujisaki |
| 6,006,201 A | 12/1999 | Berent et al. |
| 6,011,578 A | 1/2000 | Shatto et al. |
| 6,012,045 A | 1/2000 | Barzilai et al. |
| 6,415,269 B1 | 7/2002 | Dinwoodie |
| 6,516,464 B1 | 2/2003 | Claessens |
| 6,519,570 B1 | 2/2003 | Faber et al. |
| 6,718,312 B1 * | 4/2004 | McAfee et al. .................. 705/37 |
| 6,871,190 B1 | 3/2005 | Seymour et al. |
| 6,892,186 B1 | 5/2005 | Preist |
| 6,910,019 B2 | 6/2005 | Dorr |
| 6,925,446 B2 | 8/2005 | Watanabe |
| 6,947,906 B1 | 9/2005 | Underwood et al. |
| 6,952,682 B1 | 10/2005 | Wellman |
| 7,058,602 B1 | 6/2006 | La Mura et al. |
| 7,069,243 B2 | 6/2006 | Dinwoodie |
| 7,076,460 B2 | 7/2006 | Dinwoodie |
| 7,151,540 B2 | 12/2006 | Young |
| 7,409,361 B2 | 8/2008 | Dinwoodie |
| 7,428,501 B2 | 9/2008 | Dinwoodie |
| 7,478,055 B2 | 1/2009 | Goino |
| 7,555,445 B2 | 6/2009 | Moya et al. |
| 7,555,766 B2 | 6/2009 | Kondo et al. |
| 7,558,859 B2 | 7/2009 | Kasiolas et al. |
| 7,584,124 B2 | 9/2009 | Porat et al. |
| 7,716,090 B1 * | 5/2010 | Rabenold et al. ............ 705/26.3 |
| 7,747,507 B2 | 6/2010 | Brett |
| 7,778,869 B2 | 8/2010 | Jain et al. |
| 7,809,630 B2 | 10/2010 | Payton et al. |
| 7,860,754 B2 | 12/2010 | Gonen |
| 7,895,087 B1 | 2/2011 | Gottlieb |
| 7,908,180 B2 | 3/2011 | Goclowski |
| 2008/0109301 A1 * | 5/2008 | Yee et al. ........................ 705/14 |
| 2008/0306854 A1 * | 12/2008 | Katz et al. ....................... 705/37 |

* cited by examiner

METHOD OF CONDUCTING AUCTIONS AND AUDIENCE GUIDED EVENTS UTILIZING CLOSED NETWORK SATELLITE BROADCASTS TO MULTIPLE LOCATION DIGITAL THEATER ENVIRONMENTS WITH INTEGRATED REAL TIME AUDIENCE INTERACTION

RELATED APPLICATIONS

The present invention claims priority of U.S. Provisional Patent Application Ser. No. 61/523,615 entitled "Method of Conducting Auctions and Audience Guided Events utilizing Closed Network Satellite Broadcast to Multiple Location Digital Theater Environments with Integrated Real Time Audience Interaction" filed Aug. 15, 2011.

BACKGROUND OF THE INVENTION

1. Field of the Invention

This invention generally relates to a method of conducting auctions and audience guided events, more specifically toward method of conducting auction and audience guided events utilizing closed network satellite broadcast to multiple location digital theater environments with real time audience interaction.

2. Background Information

Brief History of Auctions

The recorded history of auctions extends back to about 500 B.C. when framed historian Herodotus described Babylonian wedding auctions, noting that some women commanded a high price and others were sold with monetary compensation given (dowry style) to the bidder. Reportedly, the Roman Empire used auctions to liquidate property and goods, and was referenced as the "atrium auctionarium." This mechanism was also used by the soldiers to sell goods acquired "sub hasia" (under the spear). One bizarre account of early auctions identifies that allegedly, in the year 193 A.D. "the entire Roman Empire" was put on the auction block after being sacked. There also exists evidence of Buddhist monks in China using auctions to fund the creation of temples, with custom establishing the auctioning off of the property of deceased monks for this purpose.

In the Middle Ages, King Henry VII of England instituted some of the earliest auction laws and by the seventeenth century, auctions were held in taverns and coffee houses to sell art and other collectible items in Great Britain. Announcements of auction sales devoted to land appeared in the London Evening Post as early as 1739. The framed auction house of Sotheby's was established in 1744 and the equally famous auction house Christie's was founded in 1766.

Soon after the colonization of America, the auction process became the accepted manner of selling furs, clapboard, tobacco, corn, and other necessities. As the country developed, settlers on the western frontier bought and sold their land, crops and other items of necessity via auctions. By the $20^{th}$ century, continuing into the $21^{st}$, the auction became a well established and critical component of the modern economic system selling all manner of goods and services.

Online Auctions

The history of the online auction practically begins in 1995 through a number of distinct sources. Jerry Kaplan and Alan Fisher created the website "ONSALE" and put a wide array of merchandise up for bid in Mid-1995, including watches, wines, sports memorabilia, computer hardware and electronics devices. A Japanese company Aucnet, Inc. went online with a TV Satellite based automobile auction in Mid-1995, although they had proposed this general business model much earlier in a 1987 patent application filing. Also in 1995, Pierre Omidyar, under the name AUCTION WEB, sold his first item via an online auction platform. The item, oddly, was a broken laser pointer, which sold for $14.83 to a man who collected such objects. Omidyar quickly found that his hobby of creating an online garage sale needed to become a part-time business, which grew to a full-time endeavor within a very short period of time. Omidyar renamed his Web site "EBAY," and it quickly took off.

The auctions developed to date have fallen into a number of distinct types, each with innumerable variations. The "traditional" auction is referenced as an "open ascending price auction." It is open in the sense that the bidders bid openly against each other and the auction generally closes or ends when the no bidder is willing to increase the offered bid. This is also called an "English" auction based upon where it became popular and/or a "Paddle" auction based upon a customary tool used for indicating the willingness to bid.

Additionally relevant for the present discussion on auctions is the concept of "silent auctions" in which bids are written on a commonly viewable location and at a predetermined end time of the auction the goods go to the highest bidder. Silent auctions represent the general model for most on-line auctions as it is most easily adapted for on-line implementation. Silent auction models, however, may not offer the highest return for the seller. Consider that a common bidding strategy of buyers in silent auctions is to wait till near the end of the auction period and bid what the potential buyer believes will be the highest bid rather than what would otherwise be their highest bid in a paddle auction.

Other traditional auction formats include a Dutch auction which is an open descending price auction in which the asking price is lowered until a bidder is found willing to pay the announced price. This auction type may not obtain the maximum price for an item, which fact is due more to the personal dynamics of an open auction than the mechanics of the Dutch auction. The term Dutch auction has also come to reference a distinct auction mechanism for the sale of several fungible goods at a common price to multiple successful bidders. Variations of this second Dutch Auction type is also seen commonly in on-line variations.

Sealed auctions and variants thereof, such as known as a Vickrey auction, are closed auctions that have the bidders submit their bids simultaneously. In theory, particularly "gaming theory", these types of auctions produce similar results to a Dutch auction.

There are innumerable variations on these auction types, such as known as the Top up auction, Senior auction, Walrasian auction, Reverse auction, All pay auction and Japanese auction to name a few. In general the paddle auction type will generate the best results for the seller for most goods and services. Further paddle auctions are particularly well suited, from a sellers perspective, for one of a kind items like fine art, antiques, collectables and the like which tend to have variable perceived values in the eyes of prospective purchasers.

Patent Background for Online Auctions

Aucnet, Inc obtained an early patent relating to online auctions in 1988. U.S. Pat. No. 4,789,928 is described as disclosing an auction information transmission processing system that "is constructed by connecting a most significant front computer to a host computer, arranging at least one stage of a plurality of intermediate front computers and a plurality of least significant front computers so as to be connectable to the most significant front computer in a tree-like configuration via communication lines, and arranging a plurality of dealer terminals so as to be connectable to each of the least significant front computers via communication lines."

U.S. Pat. No. 5,774,873 discloses an electronic auction and motor vehicle auction information system which allows remote users to interactively participate in motor vehicle auction sales of motor vehicles using a personal computer.

U.S. Pat. No. 5,794,219 discloses a method of conducting an on-line auction that permits individual bidders to pool bids during a bidding session.

U.S. Pat. No. 5,818,914 discloses an auction information transmission processing system wherein the host computer connects to a satellite signal transmitter for transmitting auction data signals and other signals to a satellite through a satellite communication line, and each dealer terminal is provided with a satellite signal receiver for receiving the signals transmitted from the host computer through the satellite communication line.

U.S. Pat. No. 6,006,201 discloses an electronic auction and motor vehicle auction information system allows remote users to interactively participate in motor vehicle auction sales using a personal computer.

U.S. Pat. No. 6,012,045 discloses a computer-based method of selling consumer products and services which utilizes a computer system to maintain the electronic bid, auction and sales records, and a plurality of customer computers interconnected with the computer system via a telecommunications link.

U.S. Pat. Nos. 6,415,269, 7,069,243 and 7,076,460 disclose an interactive remote auction bidding system for conducting an auction utilizing a data input device for communication over a network to the auction site. The system includes a data processor located at the auction site for generating bid information for communication over the network to the remote locations. A processor located at the auction side monitors the participants' data input devices for sensing participant bids generated by the participants' data input devices. The system further displays visual bid information at the auction site for transmission over the network to the participants and generates audible bid information in support of that visual bid information.

U.S. Pat. No. 6,519,570 discloses a system and method of conducting a time-auction online among queuing customers.

U.S. Pat. No. 6,519,570 discloses a computer-based method and system for executing an auction in which a non-redeemable fee is collected from each auction participant to enter the bidder pool.

U.S. Pat. No. 6,871,190 discloses an interactive system that conducts auctions over an open communications network.

U.S. Pat. No. 6,892,186 discloses an auction method wherein a computer entity which comprises an algorithm for monitoring a plurality of auction entities remotely over the internet.

U.S. Pat. No. 6,910,019 discloses a method for displaying time lapse for an on-line auction.

U.S. Pat. No. 6,925,446 discloses a purchase price bid research system for on line auctions.

U.S. Pat. No. 6,947,906 discloses a method for conducting a computerized auction of government-held property that is subject to a tiered restriction process.

U.S. Pat. No. 6,952,682 discloses a system and method for matching multi-attribute online auction bids.

U.S. Pat. No. 7,058,602 discloses an auction system and method for suitable use with online transactions which provide a plurality of "enhanced auctions" which are described as to extend, augment or otherwise enhance various auction elements including, for example, the selection of participants, the grouping of participants, the moves made by participants, the bidding process of participants, the information revelation process, the auction closing process, and the auction clearing process, among others.

U.S. Pat. Nos. 7,409,361 and 7,428,501 disclose a system for conducting interactive auctions with remote bidders wherein the remote bidder system is operable to communicate a bid including bid information to the auction system based on a price for the subject of the auction, wherein the auction system uses at least a portion of the bid information to accept the bid where the price for the subject of the auction is the same when the bid is processed by the auction system and to reject the bid where the price for the subject of the auction has changed when the bid is processed by the auction system.

U.S. Pat. No. 7,478,055 discloses auction methods, auction systems and servers which can satisfy requirements other than the price for a client are provided.

U.S. Pat. No. 7,555,445 provides a computerized system and methods for conducting on-line auctions wherein concurrent auctions for one or more lots of products or services may be conducted.

U.S. Pat. No. 7,558,859 discloses a peer-to-peer auction based strategy that balances the storage of data in a data center.

U.S. Pat. No. 7,584,124 is described as "methodology, system and business model are disclosed for facilitating a fully automated buyer's auction in which the major types of transaction costs are significantly reduced by providing the buyer and the sellers with near-perfect information about one another, including information about buyer preferences and competing sellers' offers."

U.S. Pat. No. 7,747,507, owned by online auction leader eBay, Inc, discloses, broadly, a "method for facilitating commerce at an internet-based auction".

U.S. Pat. No. 7,747,507 discloses an automated ticket auctioning system that receives and evaluates bid information records received from a plurality of remote terminals wherein each bid information record corresponds to at least one bid for one or more desired seats at a venue.

U.S. Pat. No. 7,778,869 discloses a system and a method that facilitates employing an online auction in which a coupon is fairly administered.

U.S. Pat. No. 7,809,630 discloses online auction technology that includes allowing one or more bidders to each bid on one or more resources, and for each of the bidders: determining a priority level; calculating a bid rate interval; and regulating the relative likelihood of the bidder winning the auction.

U.S. Pat. No. 7,860,754 discloses a system and method for optimizing the reserve price and allocation of web page placements in an online keyword auction using generalized trade reduction.

U.S. Pat. No. 7,895,087 discloses systems for providing an on-line auction relating to "Dutch Auctions," where the subject of the auction is a plurality of similar items.

U.S. Pat. No. 7,908,180 discloses an online automobile auction, which allows the consumer to participate by using their home or portable computers and accessing the system via an Internet connection, wherein before the designated time for an auction, the consumer may access the database of available automobiles.

The above patents, which are incorporated herein by reference, evidence that the technology for conducting real time online auctions via the internet, or other computer network, is well established. However, these online auction systems are often difficult to implement in a paddle type auction environment. The present invention can utilize some of this existing online auction technologies, the details of these known components need not be discussed in the present application.

Audience Response Systems

Audience response is a type of interaction associated with the use of audience response systems (ARS), to create interactivity between a presenter and his audience.

Audience Studies Institute developed a proprietary analog ARS in the mid-1960s for evaluating the response of a theater audience to generally prerelease motion pictures, television shows and commercials. See also U.S. Pat. No. 3,943,641 (filed in 1974) relating to an early lamp based ARS. Audience response technology has evolved over time, moving away from hardware that required extensive wiring towards hand held wireless devices and small, portable receivers.

Current ARSs often combine wireless hardware with presentation software, and ARSs for remote audiences typically use telephones or web polls for audiences watching through television or the internet. In educational settings, such ARSs are often called "student response systems" or "personal response systems." The hand-held remote control that students use to convey their responses to questions is often called a "clicker."

The presenter in typical ARSs uses a computer and a video projector to project a presentation for the audience to see. In the most common use of such ARSs, presentation slides built with the audience response software display questions with several possible answers. The audience participates by selecting the answer they believe to be correct and pushing the corresponding key on their individual wireless keypads. Their answer is then sent to a base station—or receiver—that is also attached to the presenter's computer. The ARS collects the results, and the aggregate data is often graphically displayed within the presentation for all to see. Some clickers also have additional keys, allowing the presenter to ask (and audience members to answer) True/False questions or even questions calling for particular numerical answers. Depending on the presenter's requirements, the data can either be collected anonymously (e.g., in the case of voting) or it can be traced to individual participants in circumstances where tracking is required (e.g., classroom quizzes, homework, or questions that ultimately count towards a student's course grade). Incoming data may also be stored in a database that resides on the host computer, and data reports can be created after the presentation for further analysis.

There have been many reasons proposed for the use of ARSs. Commonly these are identified as improved audience attentiveness; Increased audience knowledge retention; anonymous polling; tracking of individual responses, where the "clickers" that audience members use to send their responses to the receiver and thus to the presenter's computer are often registered to a particular user, with some kind of identifying number or moniker; real time display of polling results; creation of an interactive and fun learning environment; confirmation of audience understanding of key points immediately; gathering of data for reporting and analysis.

Turning Technologies, LLC is a representative example of a company providing ARS solutions and provides an audience response system that integrates into MICROSOFT® POWERPOINT® programs and allows audiences and students to participate in presentations or lectures by submitting responses to interactive questions using a RESPONSE-CARD™ keypad or other hand-held/computer devices.

The company Poll Everywhere is another representative commercial ARS example and provides Audience Response Systems allowing for collecting questions and feedback from audiences in real-time with inexpensive mobile and web technology. The audience's responses are displayed instantly in the presenter's PowerPoint presentation or web browser.

Meridia provides a commercial audience response system that includes a collection of individual hand-held wireless keypads that audience members use to respond immediately and anonymously to pre-planned and impromptu questions. The questions, posed by presenters throughout a meeting, are displayed on a large video screen at any time. An on-site computer using Meridia's software instantly compiles the results and displays them on the same screen in three-dimensional color bar charts. The percentage or number of audience members voting for each answer can also be revealed. This audience interaction technology is used to measure changes in knowledge levels, track evolving perceptions, and evaluate meeting effectiveness. Additionally this technology has been used to speed up voting occurring in meetings.

U.S. Pat. Nos. 5,223,923 and 5,257,099 disclose a network of local area ARSs that are coupled together at a central audience response processing station through a satellite communication system for real time audience response analysis, nationally or internationally. U.S. Pat. No. 5,226,177 discloses a real time wireless ARS. U.S. Pat. No. 5,453,015 discloses an ARS for quiz shows. U.S. Pat. RE35,449 discloses an ARS that has application as an educational aid to determine the comprehension level of the pupils in a class. U.S. Pat. No. 5,812,642 discloses an ARS provided for monitoring and analyzing audience response to a broadcast promotion. U.S. Pat. No. 6,011,578 discloses an ARS wherein each clicker or response unit is provided having a dial, keypad, and a bi-conditional response mechanism. U.S. Pat. No. 6,516,464 discloses an ARS used to test selected stimuli. U.S. Pat. No. 7,151,540 discloses an ARS for collecting and displaying audience recognition information concerning a video presentation. U.S. Pat. No. 7,555,766 discloses an ARS in which, in response to the ARS, a playback operation of the content (such as a movie) is controlled, so that the "level of satisfaction felt by the audience" to the content can be increased.

The above ARS related patents, which are incorporated herein by reference, and prior art discussions evidence that the ARS technology is well established. The present invention can utilize some of this existing ARS technology and need not discuss the details of these known ARS components in the present invention. Some of these ARS technologies are not particularly well suited for use simultaneously in multiple locations or for integration into a broadcast.

Background Review

Auctions have become a critical economic mechanism for many goods and services and on-line auctions have greatly expanded the commercial reach of auctions particularly to fungible consumer goods. Paddle type auctions for high end goods, such as paintings, works of art, and similar lots, remain a critical economic mechanism; however these paddle type auctions do not translate well to the current on-line auction models preventing paddle auction formats from benefiting from the expansive advantages of on-line auctions.

It is an object of the present invention to address the deficiencies of the prior art discussed above and to do so in an efficient, cost effective manner. Advantages of the present invention will become apparent from a review of the following detailed description of presently preferred embodiments of the invention together with the attached figures wherein like reference numerals represent like elements throughout.

SUMMARY OF THE INVENTION

The various embodiments and examples of the present invention as presented herein are understood to be illustrative of the present invention and not restrictive thereof and are non-limiting with respect to the scope of the invention.

One aspect of the present invention provides a method of conducting a real time auction comprising the steps of: Broadcasting from a production studio at least high definition images of material of each lot being auctioned to at least a plurality of digital theater environments via satellite; Providing multiple auction bidders at each digital theater environment; Providing each auction bidder with individually assigned audience response system input devices; and Receiving bid information at the production studio from selected auction bidders for each lot being auctioned over a bid receiving network via the individual audience response system input devices.

The terms used herein are generally known in the television broadcasting industry; however the following definitions can provide more distinct understanding of the scope of the invention. A "production studio" or "broadcast studio" within the meaning of this application is a facility capable of producing and broadcasting digital high definition television broadcasts. "High Definition" or "HD", within the meaning of this application refers to video images, also called television signals, having resolution substantially higher than traditional television systems (standard-definition TV, or SDTV, or SD). High Definition has generally one or two million pixels per frame, roughly five times that of SD. The phrase "digital theater environments" within the meaning of this application defines a screening environment for HD broadcasts which includes a high definition large display screen (of at least 6 foot or greater) with multiple surround sound speakers. The phrase "real time" as applied to auctions in this application indicates that the bids are processed and updated and incorporated into the live (non-recorded) auction broadcast within seconds, although the broadcast may incorporate a small time delay (generally about 3-5 seconds) itself for generally editorial reasons.

The method of conducting a real time auction according to the invention may further provide that the bid receiving network includes communication from each digital theater environment location via the internet and wherein the bid receiving network includes a wireless receiver at each digital theater environment location configured to receive via a wireless connection bid information from each individually assigned audience response system input devices at that digital theater environment location and to convey the bid information to the production studio via the internet.

The method of conducting a real time auction according to the invention may further provide that the leading bidders during the auction of a lot are notified of their status as leading bidders via their assigned audience response system input devices and/or wherein leading bidders during the auction of a lot are identified in the broadcast from the production studio to each digital theater environment.

The method of conducting a real time auction according to the invention may further provide that each digital theater environment comprises at least a 1080i digital High-Definition projection system having at least a 9 foot, 16:9 screen with at least 11 high-fidelity surround sound speakers.

The method of conducting a real time auction according to the invention may further provide that each digital theater environment location is in one of a restaurant or private club.

The method of conducting a real time auction according to the invention may further provide that individual bidder information is associated with each assigned individually assigned audience response system input device including at least bibliographic bidder information and wherein individual bidder information includes individual bidding restrictions, and further including the step of preventing successful bidders from exceeding assigned individual bidding restrictions, wherein individual bidding restrictions includes one of individual maximum bid limits, aggregate maximum bid limits, and lot restrictions. The bidders during the auction of a lot may be notified via their assigned audience response system input devices of their proposed bids being refused due to application of individual bidding restrictions.

The method of conducting a real time auction according to the invention may further provide that the satellite broadcasting from the production studio includes broadcasting an auction moderator with the high definition images of material of each lot being auctioned to at least a plurality of locations of digital theater environments via satellite.

The method of conducting a real time auction according to the invention may further provide each auction bidder is a pre-approved invitee and wherein the broadcasting is exclusively to the closed network of digital theater environment locations.

One aspect of the present invention provides a method of conducting an audience guided event comprising the steps of: Broadcasting in high definition the event, which includes an event moderator, from a television production studio, via satellite to at least a plurality of locations of digital theater environments; Providing multiple event participants at each digital theater environment location; Providing an audience response system at each location and providing each event participant with individually assigned audience response system input devices wherein individual participant information is associated with each individually assigned audience response system input device; Integrating response information from each location at the production studio wherein the response information is from selected event participants at the locations via the individual audience response system input devices; Processing the integrated response information; and Incorporating the integrated response information into the high definition event broadcast of step A) by at least one of i) presenting selected processed response information to the event moderator, for the moderator to incorporate the selected processed results into the high definition event broadcast, and ii) graphically incorporating the selected processed results into the high definition event broadcast.

One aspect of the present invention provides a method of conducting an audience guided event, such as a medical educational seminar, town hall meeting, or an auction, comprising the steps of: Broadcasting in high definition the event, which includes an event moderator, from a television production studio, via satellite to at least a plurality of locations of digital theater environments; Providing multiple event participants at each digital theater environment location; Providing an audience response system and providing each event participant with individually assigned audience response system input devices wherein individual participant information is associated with each assigned individually assigned audience response system input device including at least bibliographic participant information; Receiving response information at the production studio from selected event participants via the individual audience response system input devices; and Utilizing participant information of at least some response information by at least one of (i) displaying selected individual participant information to the event moderator without displaying the selected individual participant information to the remaining participants, (ii) prioritizing responses utilizing individual participant information; and (iii) screening responses against criteria in the participant information.

As noted above a complete understanding of the invention and the advantages of the present invention will become apparent from the following detailed description of preferred embodiments of the invention together with the attached figures wherein like reference numerals represent like elements throughout.

DESCRIPTION OF THE PREFERRED EMBODIMENTS

Figure 1:
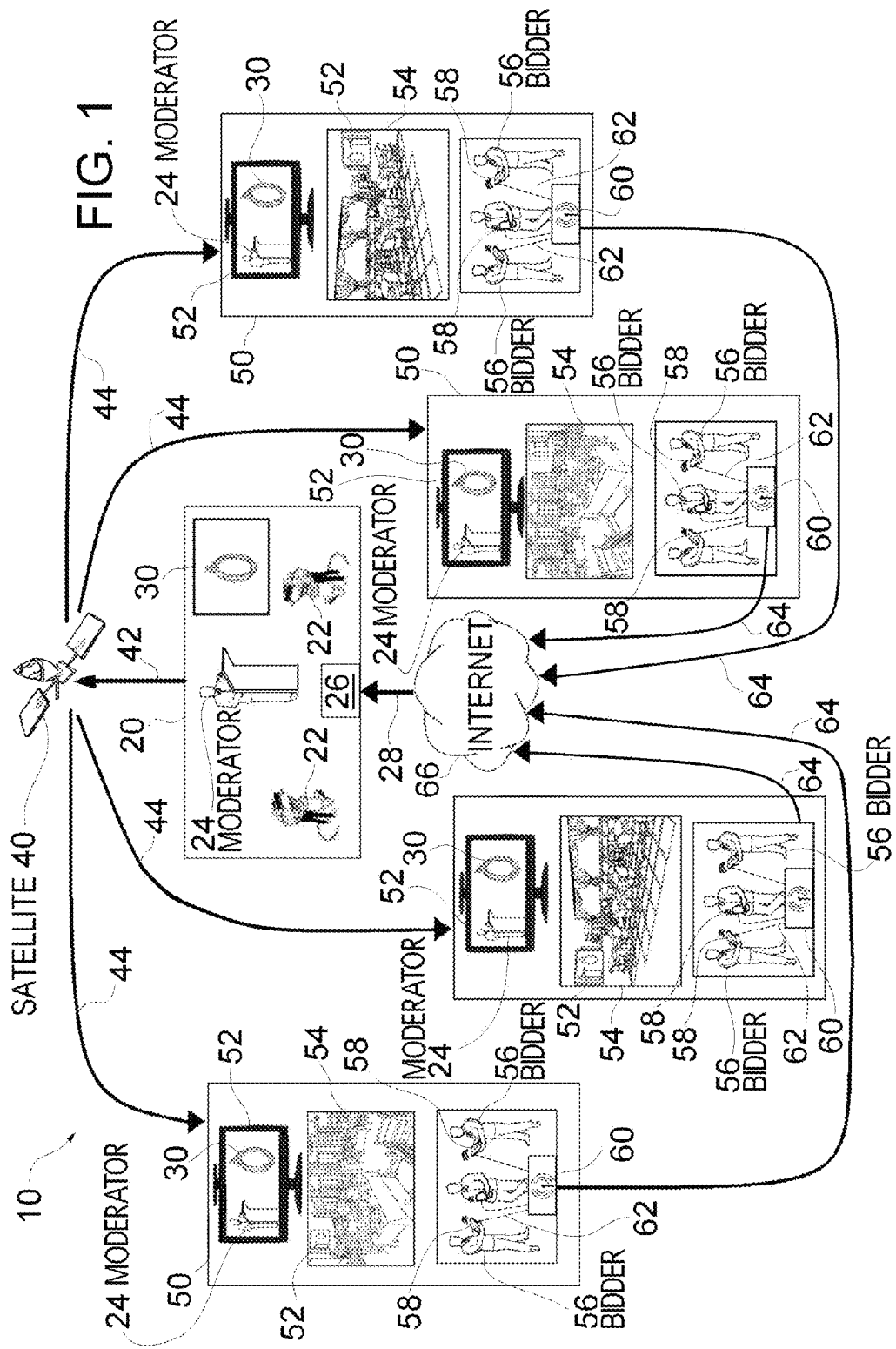
FIG. 1 schematically depicts the conducting of a real time auction utilizing closed network satellite broadcast to multiple location digital theater environments in accordance with one embodiment of the present invention.

Generally the system 10 for implementing the invention is schematically illustrated in FIG. 1 which depicts the conducting of a real time audience guided event, namely an auction, utilizing closed network satellite broadcast to multiple location digital theater environments in accordance with one embodiment of the present invention. The present invention provides a method of conducting a real time auction comprising the steps of: Broadcasting from a production studio 20 at least high definition images of material of each lot 30 being auctioned to at least of a plurality of locations 50 of digital theater environments 52 via satellite 40; Providing multiple auction bidders 56 at each digital theater environment location 50; Providing each auction bidder 56 with individually assigned audience response system input devices 58; and Receiving bid information at the production studio 20 from selected auction bidders 56 at various locations 50 for each lot 30 being auctioned over a bid receiving network via the individual audience response system input devices 58.

Figure 2:
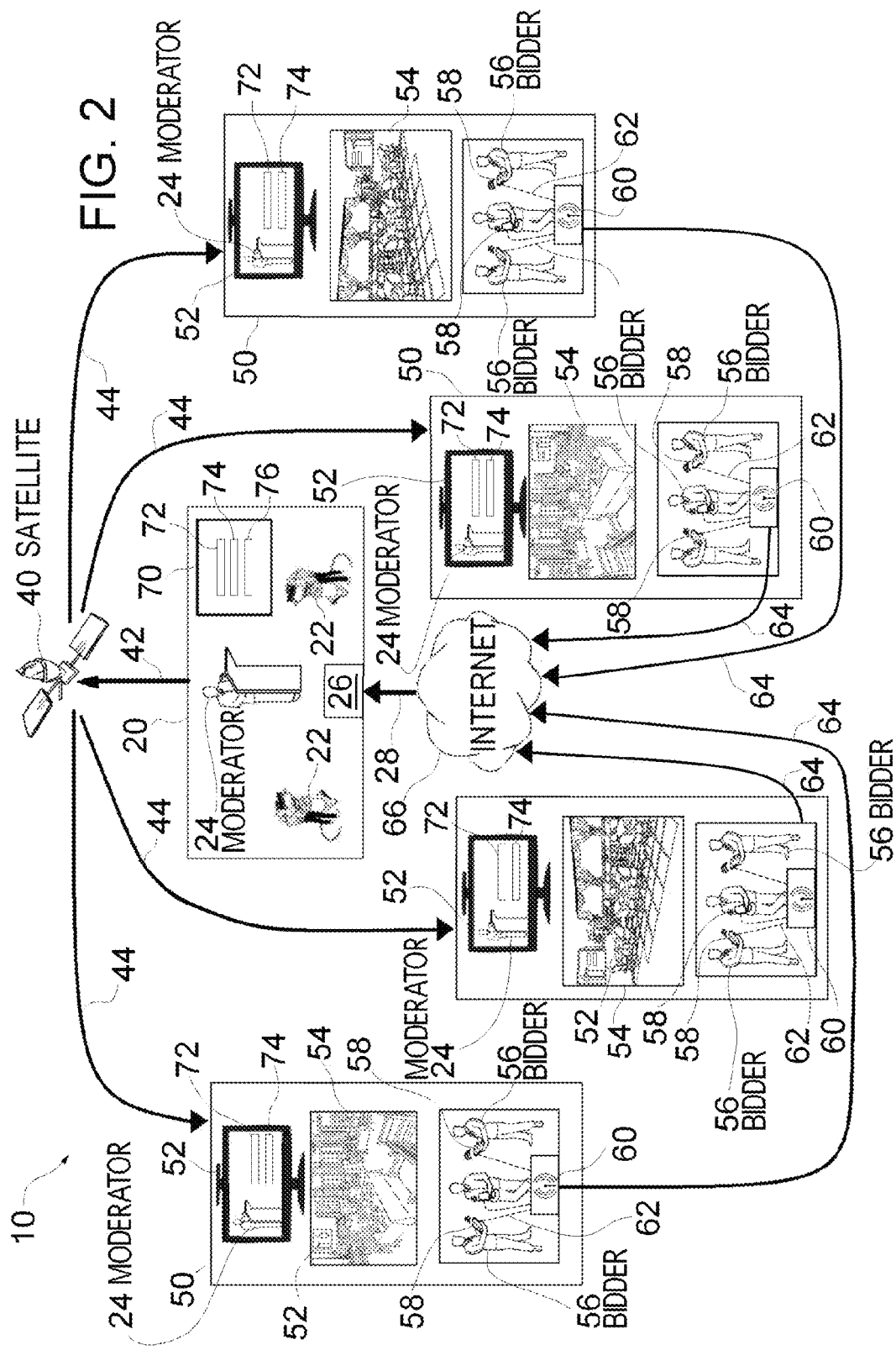
FIG. 2 schematically depicts of an conducting an audience guided event utilizing closed network satellite broadcast to multiple location digital theater environments with real time audience interaction in accordance with one embodiment of the present invention.

The production studio 20 is schematically illustrated in FIGS. 1 and 2 and is a sophisticated television broadcast production facility equipped with High-Definition recording equipment (generally represented schematically at 22) which is governed by a control 26. The control 26 discussed herein is the combination of the control equipment that receives and processes ARS inputs as discussed below, controls graphical inputs into the broadcast and other aspects of the broadcast and the control room personal that govern the equipment and direct and control the broadcast. A representative example of an appropriate production studio 20 is the assignee's VELOCITY HD® Studio that serves as a launch pad for the largest private broadcasting network in North America. The VELOCITY HD® Studio is one of the leading, fully digital, HD broadcast complexes in the nation and includes an array of high-grade, specialized HD instrumentation including graphics animation, SONY® HD Studio cameras, Teleprompters and Telestrators, and a satellite uplink center. The VELOCITY HD® Studio is located at the framed WQED Multi-Media Complex in Pittsburgh, one of the most advanced and historic television studios in the nation. WQED is home to trail-blazing TV programming such as Mister Rogers' Neighborhood and The War That Made America. This studio includes an Emmy Award-winning staff and crew experienced in delivering high-level broadcasts. In implementing the present invention the production studio 20 is a facility capable of producing and broadcasting digital high definition television broadcasts. Further, as discussed below in greater detail, the production studio 20 is capable of incorporating integrated, processed ARS results into an event broadcast.

The production studio 20 produces an auction broadcast that typically includes broadcasting an auction moderator 24, generally called the auctioneer, together with the high definition images of material of each lot 30 being auctioned. The use of the auctioneer 24 allows for the system 10 to effectively implement paddle type auction formats in the auction events. The format of paddle type auctions tends to maximize seller value as compared to timed auctions (such as silent auctions) that are subject to a number of alternative bidding strategies and results.

A skilled auctioneer 24 can be extremely helpful in further maximizing seller value in a paddle type auction format as well as generally improving the experience for the auction attendees 56. For example, skilled auctioneer can incorporate humor into the event to enhance the overall experience (e.g. "Don't worry folks, we will tell you if you bid too high!"); can adjust the speed or pace of bidding as appropriate for the occasion; can provide a reinforcement and enhancement of lot descriptions based upon the attendees and attendee feedback (e.g., prior auction lot bidding); can concentrate on select attendees for a given lot to accelerate and maintain continuous bidding, and a host of other "auction enhancements" that are significant improvements to the overall experience but can be hard to describe with particularity. In summary there is a distinct advantage to the auction experience in an auction broadcast (including improved seller value) in utilizing a skilled auctioneer 24 in conducting paddle type auctions in the present invention, particularly for auctioning of unique (non-fungible) items.

The video presentation of the lots 30 can include live footage of the lot material in the studio and/or pre-recorded images/presentation of the material of the lots 30. The lots 30 illustrated schematically is shown as jewelry, but anything collection of material can form the lots 30, such as works of art, antiquities, collectables and the like. Even intangible items such as book movie right options, patent rights, land, air, water or mineral rights can form lots 30, and such intangible items can be often far more effectively presented in a video presentation than conventional text lot listing.

The present method allows a pre-recorded video to fully describe the lots 30 for preview before the auction and/or during the auction. Such prepared presentations can often offer better disclosure of intangible or other difficult to illustrate lot material 30. For example, an aerial overview of a piece of property together with an animated representation of a possible operational drilling platform layout within the designated easements will far better convey and reinforce the lot than the mere written lot description of "includes mineral rights" for a designated parcel. Further, with the present method there no need to ship large-scale or delicate lot material 30 from continent to continent. In the present system 10, the unique attributes of auction items 30 may be pre-recorded at any corner of the globe and done so with dramatic insight. Previews and auction presentations during the HD broadcast event render lots 30 in larger-than-life stunning High-Definition clarity. The prepared presentation of the lots 30 together with the HD detail can create greater desire and interest in the subject lot material 30. The production studio 20 can seamlessly incorporate live and pre-recorded material regarding the lots 30 into the broadcast event together with the broadcasting of the event moderator or auctioneer 24.

The auctioneer or moderator 24 will act in a conventional fashion to govern the progress of the auction, at least from the perspective of the auction participants or bidders 56. In reality, or more precisely, it is the production studio 20 that will control and guide the auction event. Further, as discussed below, the auctioneer 24 will have access to at least the amounts of leading bidder's bids as well bibliographic information. The amounts and possibly names of leading bidders may be incorporated graphically into the broadcast by the production studio 24, if desired, as discussed further below.

The mechanism for closing bids and ending an auction for a given lot 30 will be conveyed to the participants 56 by the moderator 24, which can take any of a number of forms. For example, the moderator 24 may announce the lot auction has a timed ending (e.g., the lot 30 will close at 10:00 pm) and no bids will be accepted after that time. The timed ending of such an auction is analogous, in auction theory, to the silent auction.

One real advantage to the present system 10 is that with the use of the moderator 24 the system 10 can easily follow a paddle type auction format and give the participants 56 the feel of being present in one location at a paddle type auction. In the paddle type auction format the bidding on a lot 30 is "manually" ended by the moderator 24 after there is a noticed cessation in increase in the bidding (e.g., the traditional "going once . . . going twice . . . going a final time . . . and sold to Participant X at Price Y").

The manual ending of bidding by moderator 24 should include sufficient delay to relatively seamlessly reopen bidding where an acceptable new bid is determined to be prior to his closing of the auction on that lot 30. It is an aspect of paddle type auctions that the bidding increases are not uniform in amount of increases or in the timing and pace, and often the bidding seems to come to a "premature" halt, before bidding recommences only after the auctioneer announces "going once . . . going twice." Thus the participants may be notified that new bids must be submitted before "going twice" or "final time" is announced. The processing speeds of conventional ARS controls, and control 26 of production studio 20, are sufficient to allow this aspect to not detrimentally disrupt an auction broadcast. It is anticipated that where a teleprompter or telestrator is used to convey bid information to the moderator 24 (out of view of the participants 56) the system 10 prevents premature closing of bidding on a lot 30 as the studio 20 can quickly process that (a) no new acceptable bids were received after the moderator announced "going a third time" or similar "final" cutoff point and flash a "SOLD to X of Y for Z" message to the teleprompter to be announced by the moderator, or (b) a new higher bid has been received and the studio 20 send the appropriate message to the teleprompter such as "we have a new bidder on lot 30 at price X."

The processing of the bid information will transparent to the bidders 56, although successful bid information will likely be incorporated into the broadcast as discussed below. The ability of the ARS controls to receive and identify acceptable bids will actually improve upon the accuracy of a traditional paddle auction, where there is often some debate and inaccuracies in whether an auctioneer properly recognized a new bid at or close to the cutoff, or conversely whether the auctioneer improperly accepted a new bid that actually came in after the cut off. The ARS system and online auction controls give some objectivity to this process.

The studio 20 has a satellite uplink to send an encrypted HD signal 42 of the auction broadcast to satellite 40 which will transmit the location broadcast signals 44 to the closed network of remote locations 50 each having the digital theater environments 52. ECHOSTAR® Satellite systems offer an example of suitable satellite systems for receiving and conveying encrypted HD signals 42 and 44.

The digital theater environments 52 are multimedia screening rooms where custom High-Definition broadcasting of the auction or other event immerses attentive audience participants or bidders 56 (and guests—or non-bidding participants). As the digital theater environments 52 are designed and implemented by, or under the direction of, the studio 20, each digital theater environments 52 is laid out to optimum specifications and engineered to deliver the high quality sight and sound to each and every seat for the participants 56. The room is preferably temperature-controlled and preferably features a darkening system to create the desired theater-style viewing environment. All of the audio, video, and environmental components in digital theater environments 52 are preferably automated to provide supreme comfort and seamless integrations of sight and sound. For example, each digital theater environments 52 may include a 1080i digital High-Definition projection system; a 9-11 foot, 16:9 screen; 11 high-fidelity speakers providing 7.2 theater-quality surround sound.

Each digital theater environment location 50 may be a restaurant 54 or private club. There is a substantial difference in participant 56 perception to the auction experience when they experience the digital theater environment 52 in a controlled atmosphere offered by a high end restaurant 54 or private club as compared to a conventional on-line auction experienced by the same participant at home on their computer or their personal web surfing PDA device. The restaurant 54 or private club at location 50 allows interests of the participant or bidder 56 to be more effectively addressed. In other words the participants 56 are easily pampered to and catered to in the locations 50 which are restaurants 54 and private clubs. The assignee of the present invention has established suitable digital theater environments in high end restaurants 54 such as MORTON'S THE STEAK HOUSE® and MAGGIANO'S LITTLE ITALY® and in private clubs such as CLUBCORP®, each of which is particularly well suited to pamper participants in the events.

Thus the present method is intended to provide State-of-the-art, High-Definition digital theaters concealed within a sophisticated, private dining environment. As noted there is an advantage to the overall auction experience to give every participant 56 a larger than life theater type HD exposure to the lots 30 in the auction through the digital theater environments 52 and to better cater to the clientele in a high end restaurant or private club for locations 50. Further system 10 has the participants 56 travel, locally, to a designated location 50 out from their homes (as opposed to an on-line auction) and typically dressed suitably for the high end restaurant or private club 54, both factors contributing positively to the overall special event perception of the participants 56. These factors which help to establish and reinforce a "special event" status or perception by the participants 56 of the auction are also believed to increase seller value in select lots 30.

The professional auction broadcast offers an immersive marketing experience to the participants or bidders 56. The entire broadcast cycle is closely controlled by the studio 20. Programming is produced under the exacting guidance of the studio 20, which in the assignee's implementation means award-winning producers, directors and broadcast engineers, and specifically designed visually and audibly for dynamic presentation in the high-tech realm of the digital theater environments 52. From studio 20 to satellite 40 to remote location 50, the High-Definition signals 42 and 44 are safely encrypted and distributed.

The present system incorporates a generally conventional audience response system (ARS) at each location 50 wherein each auction bidder 56 is provided with individually assigned audience response system input devices 58, or clickers, for submitting bids. These clickers 58 may be, for example, customized input devices, or PDAs, or preprogrammed net-book computers with auto launched auction bidding software. The clickers 58 are assigned such that individual bidder information may be associated with each assigned clicker 58. It is also anticipated that the system 10 will operate with some or all of the participants utilizing their own input devices 58, that may in the form of particular brands of smart-phones, wherein the system 10 properly identifies the particular user's device and can assign the desired bidder information therewith. The use of a bidder's 56 own device 58 may include a downloading of a some material by the bidder 58 onto their personal device 58.

The individual bidding information will include at least bibliographic bidder information (e.g. "John Smith, Curator Pittsburgh Carnegie Museum"). The individual bidder information may further include individual bidding restrictions, such as individual maximum bid limits, aggregate maximum bid limits, and lot restrictions. The individual maximum bid limits would be an amount that the bidder 58 cannot bid above for any lot 30, and could be assigned to each lot to allow for differing amounts (e.g. John Smith may have a maximum bid of $5,000 for lot 21 and $40,000 for lot 22). These limits could be set by the individual participant 56 to prevent overbidding in the "excitement of the event", and/or by the auction house to prevent a bidder 56 from exceeding credit limit, and/or by a bidder sponsoring organization (e.g., a museum) represented by the bidder 56 to keep the bids within authorized limits. Aggregate maximum bid limits would simply be limits collected over the course of the auction event over several lots, and would act as a maximum bid limit for each lot that is decreased for subsequent lots when or if the bidder 56 is a successful final bidder on an earlier lot.

Lot restrictions can be useful where select lots are only available to certain qualified bidders. For example, certain antiquities forming a lot 30 may be limited to sale to accredited museums and institutions, or a corporation's assets forming a lot 30 may be limited to select pre-approved subset of bidders 56. These bid restrictions can work in combination as well, for example a bidder 56 may designated to bid only on lots 15, 18 and 33, with a $5,000 limit on lot 15, a $25,000 limit on Lot 18, a 20,000 limit on lot 33 and $40,000 aggregate limit. The system 10 can seamlessly incorporate such restrictions.

The clickers 58 are wirelessly coupled via wireless link 62 to a wireless receiver 60 at the location 50. Each receiver 60 is coupled via conventional link 64 to the internet 66. Controller 26 at studio 20 is coupled to the internet with coupling 28. The ARS clickers 58 allow the bidders to submit designated bids on an auction in real time and control 26 receives these bids and processes these for incorporation into the auction broadcast in real time. The processing of bids from the ARS clickers 58 received by control 26 is generally conventional in operation of traditional on-line auctions.

The processing of time stamped input bids for operating an auction in real time is known. In general the time stamped bids from each location 50 are integrated and reviewed to remove improper bids via bidding restrictions (if any). The highest bidder during the auction is generally the leading bidder. If two bidders have bid the same amount then the earliest bid based upon time stamping is the leading bidder at that amount. On-line auction software has been developed to allow for rapid identification and transmission of timed bids, including automatic bid increases by bidders and other bid simplifying procedures. The use of an auction moderator 24 allows for a generally more simplified bidding implementation to be used by clickers 58. The system 10, particularly when using a moderator 24, allows for one button clicker 58 to be easily utilized in the auction, with the button indicating when the bidder 56 is agreeing to bid.

Far more complex clickers 58 can be utilized as well with more complex devices allowing for greater feedback and/or bidder control. For example a clicker 58 such as a netbook computer or smartphone may allow a single bid to be submitted that also includes instructions to increase the bid amount by a fixed amount above the current or subsequent bids up to a maximum amount (e.g. a bidder 56 may submit or agree to a current $1000 bid and request automatic $50 increases till $2,500 is reached—at which amounts, namely competing bids of $2451 or higher, the bidder 56 must consider whether to submit a further bid). The operators may allow or discourage such automated bids as they see fit. Allowing such automated bidding gives a certain amount of freedom to the bidders 56, however it may be perceived as moving away from the conventional paddle type auction feel. Ultimately the operators may feel that a particular auction will achieve superior results by limiting such bidding options.

The leading bidders during the auction of a lot, and winning bidders at the close of an auction for a lot 30 may be notified of their status as leading or winning bidders via their assigned clickers 58 and/or wherein leading/winning bidders of a lot may be identified in the broadcast from the production studio 20 to each digital theater environment 52 (including a display of the current leading bidder via "public" bibliographic data and current bid).

As noted above the system 10 may further include the step of preventing prospective bidders from exceeding assigned individual bidding restrictions. The bidders 56 during the auction of a lot 30 may be notified via their assigned clickers 58 of their proposed bids being refused due to application of individual bidding restrictions.

Figure 3:
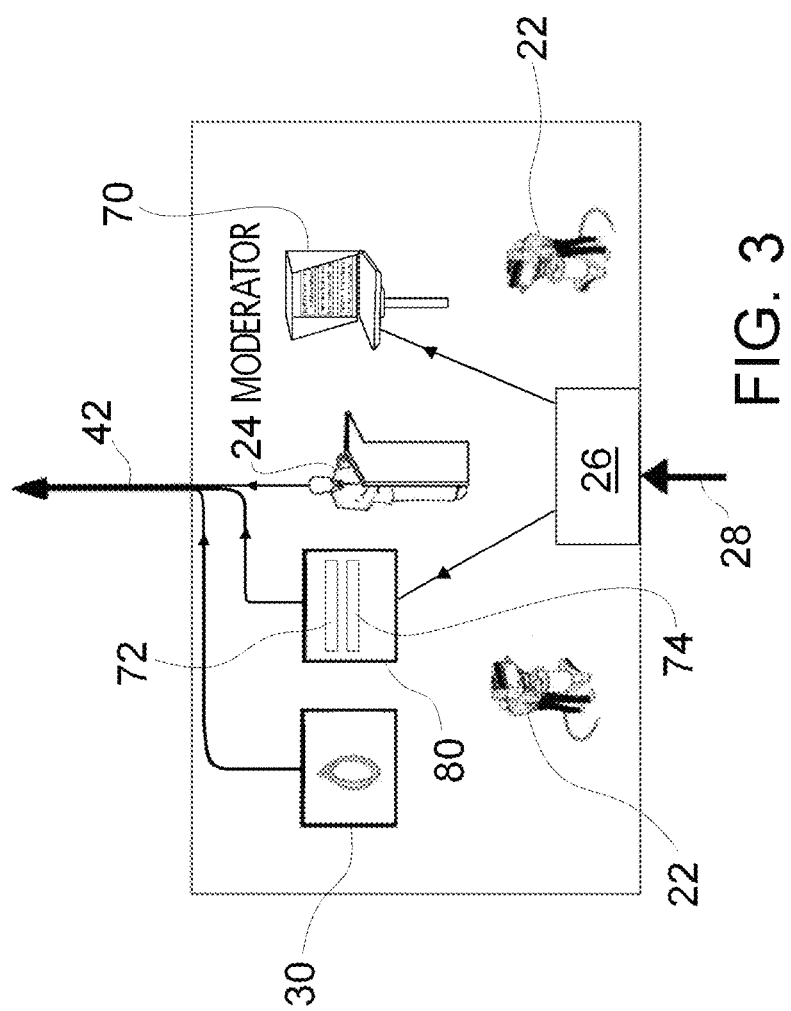
FIG. 3 schematically depicts the incorporation of ARS technology into a broadcast during an auction or other audience guided event in accordance with FIG. 1 or 2.

FIG. 3 better illustrates the incorporation of the ARS bids from all locations 50 into the broadcast. The control 26 receives the ARS generated bids from all locations 50 via the internet 66 and coupling 28 and will integrate these ARS responses from all locations 50, which is generally placing the responses into a common database.

The control 26 will process integrated ARS results, which for auction events this is an analysis of the integrated ARS results and is generally identifying the highest qualified bidder with time stamps being used to break ties. This processing software for auctions is well known relative to operating on-line auctions.

For other audience guided events these response may be question and answers and this processing step may be prioritizing responses on select criteria (e.g. questions from teaching hospitals are given highest priority for a medical teaching presentation), or it could be for audience polls wherein the processing is generating graphical or illustratable results e.g. pie chart, bar graph etc.

The control 26 of the production studio 20 incorporates ARS results into satellite broadcast by at least one of i) presenting selected processed ARS results to broadcast moderator 24 via, for example, a teleprompter 70 or telestator, or the like, so the broadcast moderator 24 can "incorporate" the ARS results into the broadcast by reading or otherwise conveying the results to the participants 56 during the broadcast;

or ii) presenting selected processed results visibly, graphically in the broadcast via, for example, graphical or animated or other visual (and/or even audible) inserts 80. Visual inserts 80 can be added to the broadcast behind the moderator 24 as is conventional in newscasts, or added as a scroll line at bottom of the screen, or panels on the left or right of the screen, or any number of other known inserts easily accomplished by control 26 of a skilled production studio 20.

In the auction format the processed ARS results are likely the leading bids which will include the "public" bibliographic information (e.g. "Jim Shaw, California Art Galleries") represented schematically by 72 in FIGS. 2 and 3, and a participants bid information (e.g, $75,000 for lot 35) represented by 74 in FIGS. 2 and 3 can be shown to the moderator 24 via teleprompter 70 and displayed in the broadcast to all participants 56 at the given locations 50 via inserts 80.

Other information, referenced herein as private information 76 (e.g., bid restriction information or other information desired by the studio 20 to assist the moderator 24 to expedite and enhance the event, such as instructions to speed up or slow down bidding, or notes relative to the progress of the event), is shown only to the moderator 24 via the teleprompter 70 in the studio 20. The bid information 74 is generated during the event, however much of the other information 72 and 76 can be prepared in advance such as when the clicker 58 is assigned to the participant 56. The control 26 will have the capacity to convey information to the moderator 24 that is not related to the ARS responses as with any HD broadcast event, such as timing instructions and camera cues and the like.

The present method was developed to enhance particular types of auctions, generally auctions of select high end goods and services, to allow for an online type of auction to be performed in a paddle type auction format. The present method and associated system 10 has application more generally to other audience guided events. An auction is only one type of audience guided event.

The method of applying this technology to auctions and other audience guided events can be described as including the steps of: Broadcasting in high definition the event, which includes an event moderator 24 (the auctioneer or the presenter), from a television production studio 24, via satellite 40 to at least a plurality of locations 50 of digital theater environments 52; Providing multiple event participants 56 at each digital theater environment location 50; Providing an audience response system and providing each event participant 56 with individually assigned audience response system input devices 58 wherein individual participant information is associated with each assigned individually assigned audience response system input device including at least bibliographic participant information; Integrating response information from each location at the production studio wherein the response information is from selected event participants at the locations via the individual audience response system input devices; Processing the integrated response information; and Incorporating the integrated response information into the high definition event broadcast by at least one of i) presenting selected processed response information to the event moderator, for the moderator to incorporate the selected processed results into the high definition event broadcast, and ii) graphically incorporating the selected processed results into the high definition event broadcast. The method will utilize participant information of at least some response information by at least one of (i) displaying selected individual participant information to the event moderator without displaying the selected individual participant information to the remaining participants, (ii) prioritizing responses utilizing individual participant information; and (iii) screening responses against criteria in the participant information.

In the more general application of this system 10 to any audience guided events (such as a question and answer session or town hall meeting, or medical symposium) it is the incorporation of the integrated processed ARS responses into the event broadcast and the use of the individual participant information by the system that are critical.

In one aspect of the invention the bibliographic information (represented by 72) and a participants inquiry or comment on the presentation (represented by 74) can be shown to the moderator 24 via telestrator or teleprompter 70 and displayed in the broadcast to all participants 56 at the given locations 50 via studio generated inserts 80, while other information, private information 76, is shown only to the moderator 24. This can be illustrated with two representative examples. In a medical presentation the participant 56 sends in a question (item 74) "Is the prosthetic mesh bio-absorbable?", while the system 10 has the previously entered bibliographic information 72 "Dr. Eric Nicols, President of the International Hernia Society" for all to see via insert 80, while the moderator 24 is also shown private information 76 "Dr. Nicols is an inventor of numerous biologic hernia repair prosthesis and is an innovator in the field of minimally invasive repair techniques" which the moderator 24 can use to personalize the broadcast or steer the information based upon what questions are raised.

In a political meet and greet town hall type meeting a participant 56 may ask a moderator/Politian 24 "What are your views on Litigation Reform?" as item 74, with the system 10 having bibliographic information for public "John Snow, CEO Jet Turbine Incorporated" in item 72, while the moderator/Politian 24 is prompted on the teleprompter 70 with the information 76 not shared with other participants such as "John "JAKE" Snow and Jet Turbine primarily interested in limiting manufacturers liability and concerned with anti-dumping enforcement. Located in critical swing district of Allegheny." The moderator 24 can then use the added private information 76 to better guide the presentation.

Further the method allows for easy prioritizing of responses utilizing individual participant information which would be private information 76 but not all of this need be displayed to the moderator 24 with every question. For example in a medical presentation questions from teaching institutions and teaching professionals may be given top priority and selected first. In a political discussion similar prioritization can be given to swing district residents or maximum contributors or other desired criteria. As much of the information is pre-assigned the control 26 in studio 20 can select during the broadcast how to utilize the information to prioritize the participant responses as well as using predefined designated prioritization rules.

Similar to prioritizing responses is the screening of responses based upon the particular user information. An illustrative example is refusing to accept a bid if it exceeds of violates a bid restriction associated with this participant.

With the present system 10 and method, the days of single-city conferences/presentations may be nearing an end. Instead of inviting 1,000 attendees to New York City, the present invention allows an auction holder to invite 5,000 participants' to attend the auction or presentation in smaller groups at venues local to them. Precision broadcasting enables the user to create unique lot presentation and/or programming designed for an invitation-only audience and at a fraction of the economic and environmental impact of requiring an audience to travel. The system 10 allows an auction house or presenter to expand attendance beyond physical limits of their conventional single site venue. The auction or presentation easily transcends time zones and gets the audience closer through the dynamic HD technology with ARS technology that allows the audience to be an interactive part of the broadcast for guiding the direction and/or progress of the broadcast.

The system 10 offers unmatched national peer-to-peer impact to medical device companies to enable them to deliver a multi-market message by key opinion leaders and transforms a traditional podium talk or lab demonstration into a stunning national event. These benefits are afforded the participants 56 without the proposition of time away from the laboratory or office and without the rigors and expense of travel. Instead of training representatives to present a surgical procedure locally, the present system 10 allows the user to exhibit the expertise of top surgeons globally.

The auction methodology of the present invention virtually eliminate overhead. The system 10 provides the perfect auction block for antique and art auction services, and private and estate sales, and any intangible properties, widening accessibly to a worldwide audience with limited travel for bidders, while providing these bidders with uncompromising hospitality. The bidders 56—and lots 30—are connected through the digital theater environment 52 and the Audience Response System (ARS). They are gathered at intimate venues 50 throughout the world. The system 10 is the basis for real-time auctioning, wherein bidding takes place effectively instantly and unhindered. There's no need for casual collectors or auction novices to make the costly commitment to travel as they attend locally. Auction houses obtain a global presence with increased attendance and increased sales and profit. Further there's no need to ship large-scale or delicate items from continent to continent. The High-Definition clarity provides better than in-person view of lots 30.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of conducting a real time auction comprising the steps of:
    Broadcasting from a production studio, at least high definition images of material of each lot being auctioned to at least a plurality of locations of digital theater environments via satellite;
    Providing multiple, auction bidders at each digital theater environment location;
    Providing each auction bidder with individually assigned audience response system input devices; and
    Receiving bid information at the production studio from selected auction bidders for each lot being auctioned over a bid receiving network via the individual audience response system input devices.

2. The method of conducting a real time auction according to claim 1, wherein the bid receiving network includes communication from each digital theater environment location via the internet.

3. The method of conducting a real time auction according to claim 2, wherein the bid receiving network includes a wireless receiver at each digital theater environment location configured to receive via a wireless connection bid information from each individually assigned audience response system input devices at that digital theater environment location and to convey the bid information to the production studio via the internet.

4. The method of conducting a real time auction according to claim 2, wherein leading bidders during the auction of a lot are notified of their status as leading bidders via their assigned audience response system input devices.

5. The method of conducting a real time auction according to claim 2, wherein leading bidders during the auction of a lot are identified in the broadcast from the production studio to each digital theater environment.

6. The method of conducting a real time auction according to claim 2, wherein each digital theater environment comprises at least a 1080i digital High-Definition projection system having at least a 9 foot, 16:9 screen with at least 11 high-fidelity surround sound speakers.

7. The method of conducting a real time auction according to claim 6, wherein each digital theater environment location is in one of a restaurant or private club.

8. The method of conducting a real time auction according to claim 1 wherein individual bidder information is associated with each assigned individually assigned audience response system input device including at least bibliographic bidder information.

9. The method of conducting a real time auction according to claim 8 wherein individual bidder information includes individual bidding restrictions, and further including the step of preventing successful bidders from exceeding assigned individual bidding restrictions.

10. The method of conducting a real time auction according to claim 9 wherein individual bidding restrictions includes one of individual maximum bid limits, aggregate maximum bid limits, and lot restrictions.

11. The method of conducting a real time auction according to claim 9 wherein bidders during the auction of a lot are notified via their assigned audience response system input devices of their proposed bids being refused due to application of individual bidding restrictions.

12. The method of conducting a real time auction according to claim 1 wherein the satellite broadcasting from the production studio includes broadcasting an auction moderator with the high definition images of material of each lot being auctioned to at least a plurality of locations of digital theater environments via satellite.

13. The method of conducting a real time auction according to claim 1 wherein each auction bidder is a pre-approved invitee.

14. The method of conducting a real time auction according to claim 1 wherein the broadcasting is exclusively to the closed network of digital theater environment locations.

15. A method of conducting an audience guided event comprising the steps of:
    A) Broadcasting in high definition the event, which includes an event moderator, from a television production studio, via satellite to at least a plurality of locations of digital theater environments;
    B) Providing multiple event participants at each digital theater environment location;
    C) Providing an audience response system at each location and providing each event participant with individually assigned audience response system input devices wherein individual participant information is associated with each individually assigned audience response system input device;
    D) Integrating response information from each location at the production studio wherein the response information is from selected event participants at the locations via the individual audience response system input devices;
    E) Processing the integrated response information; and F) Incorporating the integrated response information into the high definition event broadcast of step A) by at least one of i) presenting selected processed response information to the event moderator, for the moderator to incorporate the selected processed results into the high definition event broadcast, and ii) graphically incorporating the selected processed results into the high definition event broadcast.

16. The method of conducting an audience guided event according to claim 15, wherein each digital theater environment comprises at least a 1080i digital High-Definition projection system having at least a 9 foot, 16:9 screen with at least 11 high-fidelity surround sound speakers, and wherein the step of incorporating the integrated response information into the high definition event broadcast includes displaying selected individual participant information to the event moderator without displaying the selected individual participant information to the remaining participants.

17. The method of conducting an audience guided event according to claim 16, wherein each digital theater environment location is in one of a restaurant or private club and wherein the step of processing the integrated response information includes at least one of (i) prioritizing responses utilizing individual participant information, and (ii) screening responses against criteria in the participant information.

18. The method of conducting an audience guided event according to claim 15. wherein the audience guided event is an auction.

19. A method of conducting an audience guided event comprising the steps of:

Broadcasting in high definition the event, which includes an event moderator, from a television production studio, via satellite to at least a plurality of locations of digital theater environments;

Providing multiple event participants at each digital theater environment location;

Providing an audience response system and providing each event participant with individually assigned audience response system input devices wherein individual participant information is associated with each assigned individually assigned audience response system input device including at least bibliographic participant information;

Receiving response information at the production studio from selected event participants via the individual audience response system input devices; and Utilizing participant information of at least some response information by at least one of (i) displaying selected individual participant information to the event moderator without displaying the selected individual participant information to the remaining participants, (ii) prioritizing responses utilizing individual participant information; and (iii) screening responses against criteria in the participant information.

20. The method of conducting a real time auction according to claim 19 wherein each digital theater environment location is in one of a restaurant or private club, and wherein individual bidder information is associated with each assigned individually assigned audience response system input device including at least bibliographic bidder information and bidding restrictions.

* * * * *